US012066251B2

(12) United States Patent
Jin et al.

(10) Patent No.: US 12,066,251 B2
(45) Date of Patent: Aug. 20, 2024

(54) SYSTEM FOR TREATING OILY SOLID MATERIAL AND METHOD FOR TREATING OILY SOLID MATERIAL

(71) Applicant: JEREH ENVIRONMENTAL PROTECTION TECHNOLOGY CO., LTD., Shandong (CN)

(72) Inventors: Zhaodi Jin, Shandong (CN); Peichao Cong, Shandong (CN); Zhe'na Zhang, Shandong (CN); Yan Zhang, Shandong (CN); Chuangang Lin, Shandong (CN); Chengzhen Wang, Shandong (CN); Zhixue Wang, Shandong (CN); Rengang Liang, Shandong (CN)

(73) Assignee: JEREH ENVIRONMENTAL PROTECTION TECHNOLOGY CO., LTD., Shandong (CN)

( * ) Notice: Subject to any disclaimer, the term of this patent is extended or adjusted under 35 U.S.C. 154(b) by 708 days.

(21) Appl. No.: 17/417,649

(22) PCT Filed: May 7, 2021

(86) PCT No.: PCT/CN2021/092131
§ 371 (c)(1),
(2) Date: Jun. 23, 2021

(87) PCT Pub. No.: WO2022/198759
PCT Pub. Date: Sep. 29, 2022

(65) Prior Publication Data
US 2023/0133498 A1 May 4, 2023

(30) Foreign Application Priority Data
Mar. 26, 2021 (CN) ........................ 202110325285.6

(51) Int. Cl.
*F27D 11/06* (2006.01)
*F27B 1/26* (2006.01)
(Continued)

(52) U.S. Cl.
CPC ................ *F27D 11/06* (2013.01); *F27B 1/26* (2013.01); *F27B 1/28* (2013.01); *F27B 17/0016* (2013.01);
(Continued)

(58) Field of Classification Search
CPC ........ F27D 11/06; F27D 15/0206; F27B 1/26; F27B 1/28; F27B 7/0016; F27M 2001/05
(Continued)

(56) References Cited

U.S. PATENT DOCUMENTS 2,457,846 A * 1/1949 Strickland, Jr. ......... F27D 11/06 219/649
5,321,896 A * 6/1994 Brownewell ............ H05B 6/06 118/643
(Continued)

FOREIGN PATENT DOCUMENTS

CA 3110177 A1 * 2/2020 ............. B22D 41/01
CN 105201432 A 12/2015
(Continued)

*Primary Examiner* — Stephen M Gravini
(74) *Attorney, Agent, or Firm* — XSENSUS LLP

(57) ABSTRACT

Embodiments of the present disclosure provide a system for treating oily solid material and a method for treating oily solid material. The system for treating oily solid material includes a thermal desorption module, a thermal desorption vapor treatment module and an incondensable gas treatment module. The thermal desorption module includes a vertical furnace body, a stirring shaft and an electromagnetic induction heating coil assembly. The electromagnetic induction heating coil assembly includes a plurality of coil units sequentially arranged at an outer side of the sidewall of the
(Continued)

vertical furnace body along the height direction (Y). A heating power of each of the plurality of coil units is configured to be independently controlled.

20 Claims, 4 Drawing Sheets

(51) Int. Cl.
*F27B 1/28* (2006.01)
*F27B 17/00* (2006.01)
*F27D 15/02* (2006.01)

(52) U.S. Cl.
CPC ..... *F27D 15/0206* (2013.01); *F27M 2001/05* (2013.01)

(58) Field of Classification Search
USPC ........................................................... 34/247
See application file for complete search history.

(56) References Cited

U.S. PATENT DOCUMENTS

| | | | | |
|---|---|---|---|---|
| 5,680,711 A * | 10/1997 | Moratalla | F26B 21/086 | 34/77 |
| 5,911,487 A * | 6/1999 | Dricken | F26B 5/04 | 34/92 |
| 5,921,002 A * | 7/1999 | Scheufler | B01D 53/261 | 34/571 |
| 8,677,650 B2 * | 3/2014 | Watterodt | F26B 25/003 | 623/1.48 |
| 10,252,329 B2 * | 4/2019 | Atkins | F27D 15/02 | |
| 10,590,594 B2 * | 3/2020 | Berdut-Teruel | F26B 11/00 | |
| 11,359,860 B2 * | 6/2022 | McNeil | C11B 1/10 | |
| 11,827,966 B2 * | 11/2023 | Masten, Jr. | F27B 17/0016 | |
| 2015/0143806 A1 * | 5/2015 | Friesth | F01K 13/02 | 220/592.2 |
| 2015/0226485 A1 * | 8/2015 | Steinlage | F27B 14/061 | 373/165 |
| 2023/0133498 A1 * | 5/2023 | Jin | F27B 1/28 | 34/247 |

FOREIGN PATENT DOCUMENTS

| | | | | |
|---|---|---|---|---|
| CN | 109538139 A | | 3/2019 | |
| CN | 209049368 U | | 7/2019 | |
| CN | 110756557 A | | 2/2020 | |
| CN | 111577176 A | | 8/2020 | |
| CN | 211360026 U | | 8/2020 | |
| CN | 212328326 U | | 1/2021 | |
| CN | 112645563 A | | 4/2021 | |
| CN | 112852469 A | * | 5/2021 | C10G 1/002 |
| WO | WO-2014153570 A2 | * | 9/2014 | B01D 3/06 |
| WO | WO-2020041370 A1 | * | 2/2020 | B22D 41/01 |
| WO | WO-2022198759 A1 | * | 9/2022 | C10G 1/002 |

* cited by examiner

SYSTEM FOR TREATING OILY SOLID MATERIAL AND METHOD FOR TREATING OILY SOLID MATERIAL

For all purposes, the present application claims priority from Chinese Patent Application No. 202110325285.6 filed on Mar. 26, 2021, and the content disclosed in the above-mentioned Chinese patent application are hereby incorporated in its entirety as a part of the present application.

TECHNICAL FIELD

Embodiments of the present disclosure relates to a system for treating oily solid material and a method for treating oily solid material.

BACKGROUND

Thermal desorption technology was first applied to soil organic matter remediation. With the continuous improvement and perfection of technology, it is gradually applied to the field of oil-based drilling waste treatment. Thermal desorption technology can be divided into direct heating technology and indirect heating technology, and indirect heating technology is widely used. It uses the high temperature generated by external heat source to heat a chamber, and transfers the heat energy to solid waste to evaporate volatile substances contained in the solid waste, which are then recovered by a condensing tower and a separation equipment. At present, there are four main indirect heating methods: heat conduction oil heating, natural gas/oil burning fire heating, electric heating and microwave heating. Among these four methods, natural gas/oil burning fire heating is widely used, but a large amount of flue gas will be produced during operation, which can only be discharged after being treated by a flue gas treatment equipment. In addition, this heating method has low heat transfer efficiency, uneven heating, and cannot accurately control the temperature, and has high requirements on the material of the furnace body; and it cannot be used in some places where open flames are restricted. The electromagnetic heating method can effectively solve the above problems, and has high safety and is not restricted by regions, which can effectively solve the problem of open flame restriction.

SUMMARY

An embodiment of the present disclosure provides a system for treating oily solid material, including a thermal desorption module, a thermal desorption vapor treatment module and an incondensable gas treatment module which are sequentially communicated in a gas flowing direction. The thermal desorption module includes a vertical furnace body, a stirring shaft and an electromagnetic induction heating coil assembly. The vertical furnace body includes a top wall and a bottom wall which are opposite to each other in a height direction, and a sidewall connecting the top wall and the bottom wall, wherein the top wall, the bottom wall, and the sidewall enclose a heat treatment chamber extending in the height direction. The stirring shaft is connected with the vertical furnace body, and a part of the stirring shaft is located in the heat treatment chamber. The electromagnetic induction heating coil assembly includes a plurality of coil units sequentially arranged at an outer side of the sidewall of the vertical furnace body along the height direction. A heating power of each of the plurality of coil units is configured to be independently controlled.

In an example, the thermal desorption vapor treatment module includes: a first condenser and a first liquid storage tank, connected in series and between the vertical furnace body and the incondensable gas treatment module; a second condenser and a second liquid storage tank, connected in series and between the vertical furnace body and the incondensable gas treatment module; and a first valve assembly, wherein the vertical furnace body is connected with the first condenser and the second condenser through the first valve assembly, and the first valve assembly is configured to switch between a first communication state and a second communication state, the first communication state is a state that the heat treatment chamber of the vertical furnace body is communicated with the first condenser but not communicated with the second condenser; the second communication state is a state that the heat treatment chamber of the vertical furnace body is communicated with the second condenser but not communicated with the first condenser.

In an example, the first valve assembly includes: a first valve, arranged on a first pipeline connecting the heat treatment chamber of the vertical furnace body with the first condenser to control a conduction state of the first pipeline; and a second valve, arranged on a second pipeline connecting the heat treatment chamber of the vertical furnace body with the second condenser to control a conduction state of the second pipeline.

In an example, each of the first valve and the second valve is a temperature control valve, the first valve is configured to be in an open state upon a monitored temperature being smaller than or equal to a first temperature, so that the heat treatment chamber is communicated with the first condenser through the first pipeline, and in a closed state upon the monitored temperature is greater than the first temperature, so that the heat treatment chamber is not communicated with the first condenser, the second valve is configured to be in a closed state upon the monitored temperature being smaller than or equal to the first temperature, so that the heat treatment chamber is not communicated with the second condenser, and in an open state upon the monitored temperature is greater than the first temperature, so that the heat treatment chamber is communicated with the second condenser through the second pipeline, wherein the monitored temperature is a temperature of the heat treatment chamber or a temperature of a cavity between the heat treatment chamber and the first condenser and the second condenser along the gas flowing direction.

In an example, the system for treating oily solid material further includes: a tubular member, communicated with the heat treatment chamber at a first opening of the top wall of the vertical furnace body, and a temperature sensor, located in a tubular cavity of the tubular member, wherein, in the height direction, the temperature sensor is located at a side of the top wall opposite to the bottom wall, the temperature sensor is configured to provide the monitored temperature.

In an example, the first condenser and the second condenser are connected with the first liquid storage tank and the second liquid storage tank through a second valve assembly, the second valve assembly is configured to switch between a third communication state, a fourth communication state, and a fifth communication state, wherein, the third communication state is a state that the first condenser is communicated with the first liquid storage tank but not communicated with the second liquid storage tank, and the second condenser is communicated with the second liquid storage tank but not communicated with the first liquid storage tank; the fourth communication state is a state that the first condenser is communicated with the second liquid storage tank but not communicated with the first liquid storage tank; the fifth communication state is a state that the second condenser is communicated with the first liquid storage tank but not communicated with the second liquid storage tank.

In an example, the second valve assembly includes: a third valve arranged on a third pipeline connecting the first condenser and the first liquid storage tank to control a conduction state of the third pipeline; a fourth valve arranged on a fourth pipeline connecting the second condenser and the second liquid storage tank to control a conduction state of the fourth pipeline; and a fifth valve arranged on a fifth pipeline connecting with the third pipeline and the fourth pipeline to control a conduction state of the fifth pipeline.

In an example, the system for treating oily solid material further includes a chevron mist eliminator, a water ring vacuum pump and a Roots vacuum pump which are sequentially connected in series and between the thermal desorption vapor treatment module and the incondensable gas treatment module in the gas flowing direction.

In an example, the incondensable gas treatment module includes an alkali washing device, a deep cooling device and an activated carbon adsorption device which are sequentially connected in series in the gas flowing direction.

In an example, the system for treating oily solid material further includes a discharge screw conveyor, communicated with the heat treatment chamber at a second opening of the bottom wall of the vertical furnace body through a discharge valve, the thermal desorption vapor treatment module further includes a cooling device which is connected with the first condenser, the second condenser and the discharge screw conveyor to provide cooling fluid media for the first condenser, the second condenser and the discharge screw conveyor.

In an example, the system for treating oily solid material further includes a feeding module, wherein the feeding module includes a hopper, a feeding screw conveyor and a transfer pump which are connected in sequence, and the transfer pump is communicated with the heat treatment chamber at a third opening of the top wall of the vertical furnace body through a feeding valve.

In an example, the system for treating oily solid material further includes a position detector located at a side of the top wall facing the bottom wall, configured to detect a height position of a surface of the solid material facing the top wall in the heat treatment chamber of the vertical furnace body in the height direction.

In an example, the thermal desorption module further includes a heat insulation layer covering outer surfaces of the top wall, the bottom wall and the sidewall of the vertical furnace body, and a part of the heat insulation layer is located between the vertical furnace body and the electromagnetic induction heating coil assembly.

Another embodiment of the present disclosure provides a method for treating oily solid material, including: filling a heat treatment chamber of a vertical furnace body with an oily solid material to be treated, wherein the heat treatment chamber is enclosed by a top wall, a bottom wall and a sidewall connecting the top wall and the bottom wall, and an electromagnetic induction heating coil assembly is arranged at an outer side of the sidewall of the vertical furnace body, and the electromagnetic induction heating coil assembly includes a plurality of coil units sequentially arranged in a vertical direction; turning on at least part of the plurality of coil units into a heating state to heat the oily solid material to be treated in the heat treatment chamber; determining at least one of the at least part of the plurality of coil units which have been turned on as a coil unit to be regulated, and at least another of the at least part of the plurality of coil units which have been turned on as a reference coil unit, according to a change of filling rate of the oily solid material to be treated in the heat treatment chamber, wherein the reference coil unit is closer to the bottom wall of the vertical furnace body than the coil unit to be regulated in the vertical direction; and reducing a heating power of the coil unit to be regulated while keeping the reference coil unit in the heating state.

In an example, in the vertical direction, each of the plurality of coil units provides a reference position between a position closest to the top wall and a position closest to the bottom wall, determining at least one of the at least part of the plurality of coil units which have been turned on as the coil unit to be regulated according to the change of filling rate of the oily solid material to be treated in the heat treatment chamber includes: upon the surface of the oily solid material to be treated facing the top wall is not higher than at least one reference position in the vertical direction, determining the coil unit providing the at least one reference position as the coil unit to be regulated.

In an example, in the vertical direction, for at least one of the coil units, a distance between the reference position provided thereby and the position thereof closest to the bottom wall is greater than or equal to 5 cm and smaller than or equal to 10 cm.

In an example, reducing the heating power of the coil unit to be regulated while keeping the reference coil unit in the heating state includes: reducing the heating power of the coil unit to be regulated by 60% to 90% while keeping the reference coil unit in a heating state.

In an example, turning on at least part of the plurality of coil units into a heating state to heat the oily solid material to be treated in the heat treatment chamber includes: raising a temperature in the heat treatment chamber to a first temperature and keeping the temperature in the heat treatment chamber at the first temperature for a first time period; condensing and collecting a first distillate evaporated from the oily solid material to be treated through a first condensing pipeline communicated with the heat treatment chamber in the first time period; raising the temperature in the heat treatment chamber to a second temperature and keeping the temperature in the heat treatment chamber at the second temperature for a second time period, the second temperature being greater than the first temperature; and condensing and collecting a second distillate evaporated from the oily solid material to be treated through a second condensing pipeline communicated with the heat treatment chamber in the second time period.

In an example, a gas pressure in the heat treatment chamber is a first pressure in the first time period, and the first temperature is greater than or equal to a first boiling point temperature of water under the first pressure and less than a second boiling point temperature of an oil-based substance in the oily solid material under the first pressure.

In an example, a gas pressure in the heat treatment chamber is a second pressure in the second time period, and the second temperature is greater than or equal to a third boiling point temperature of an oil-based substances in the oily solid material under the second pressure.

BRIEF DESCRIPTION OF THE DRAWINGS

In order to explain the embodiments of the present disclosure more clearly, the drawings used in the embodiments or the description of the prior art will be briefly introduced below. Obviously, the drawings in the following description are only some embodiments of this disclosure, and other embodiments can be obtained by those ordinarily skilled in the art according to these drawings without inventive work.

DESCRIPTION OF REFERENCE NUMERALS

Figure 1:
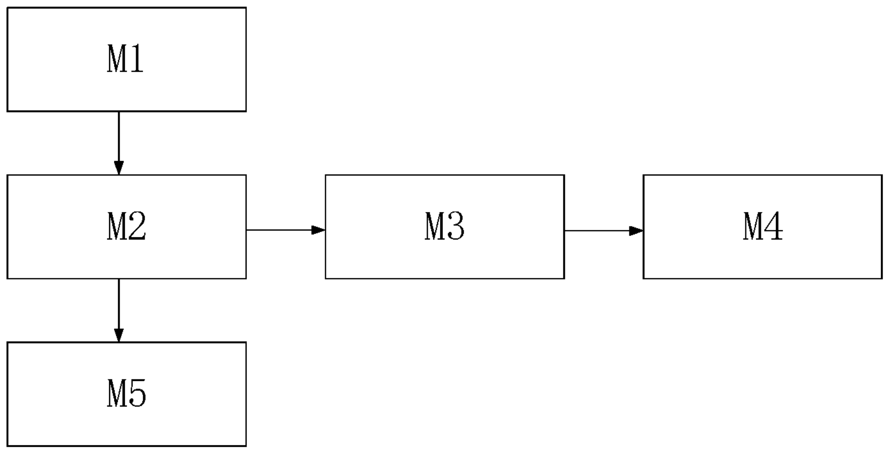
FIG. 1 shows a schematic block diagram of modules and communication relationship thereof in a system for treating oily solid material provided by an embodiment of the present disclosure.

M1: feeding module; M2: thermal desorption module; M3: thermal desorption vapor treatment module; M4: incondensable gas treatment module; M5: discharge module; 101: hopper; 102: feeding screw conveyor; 103: transfer pump; 201: tubular member; 202: feed valve; 203: stirring shaft; 2031: external thread structure; 204: tubular member; 205: electromagnetic induction heating coil assembly; 206: vertical furnace body; 207: heat insulation layer; 208: tubular member; 2061: top wall; 2062: bottom wall; K1: first opening; K2: second opening; K3: third opening; 2063: sidewall; Y: height direction; X: horizontal direction; C: heat treatment chamber; L1~L5: coil units; 207: heat insulation layer; SW, SW', SW'': oily solid material; S1-S3: surface of the oily solid material facing the top wall; R1~R5: reference position; L11~L51: position of coil unit closest to the bottom wall; L12~L52: position of coil unit closest to the top wall; P: position detector; 301: discharge valve; 302: discharge screw conveyor; 303: tubular member; 4: storage bin; 501: first condenser; 502: second condenser; 503: cooling device; 601: first liquid storage tank; 602: second liquid storage tank; K1: first valve; K2: second valve; K3: third valve; K4: fourth valve; K5: fifth valve; G1: first pipeline; G2: second pipeline; G3: third pipeline; G4: fourth pipeline; G5: fifth pipeline; T: temperature sensor; 7: chevron mist eliminator; 801: water ring vacuum pump; 802: roots vacuum pump; 9: alkaline washing device; 10: deep cooling device; 11: activated carbon adsorption device.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the disclosure, words such as "first", "second" and the like do not denote any order, quantity, or importance, but rather are used for distinguishing different components. Similarly, words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of the described object is changed, the relative positional relationship may also be correspondingly changed.

The inventors of the present application noticed that, with regard to the existing horizontal reaction kettle, because the electromagnetic heater heats the upper space without oily solid waste and the lower space with oily solid waste in the horizontal reaction kettle at the same time at basically the same temperature, the reaction kettle will deform due to uneven heating. With regard to the existing vertical reaction kettle, the electromagnetic heater heats the whole vertical reaction kettle. Therefore, during the heating process, the filling rate of material gradually decreases, and the space without solid material in the upper part and the space filled with solid material in the lower part are still heated at basically the same temperature, which will cause uneven heating and deformation of the reaction kettle on the one hand, and great energy waste on the other hand.

An embodiment of the disclosure provides a system for treating oily solid material, which includes a thermal desorption module, a thermal desorption vapor treatment module and an incondensable gas treatment module which are sequentially communicated in a gas flowing direction. The thermal desorption module includes a vertical furnace body, a stirring shaft and an electromagnetic induction heating coil assembly. The vertical furnace body includes a top wall and a bottom wall which are opposite to each other in a height direction, and a sidewall connecting the top wall and the bottom wall; the top wall, the bottom wall and the sidewall enclose a heat treatment chamber extending in the height direction. The stirring shaft is connected to the vertical furnace body, and a part of the stirring shaft is located in the heat treatment chamber. The electromagnetic induction heating coil assembly includes a plurality of coil units sequentially arranged at an outer side of the sidewall of the vertical furnace body along the height direction, and a heating power of each electromagnetic induction heating coil unit is capable of being independently controlled.

Another embodiment of the disclosure provides a method for treating oily solid material, which includes: filling a heat treatment chamber of a vertical furnace body with an oily solid material to be treated, wherein the heat treatment chamber is enclosed by a top wall, a bottom wall and a sidewall connecting the top wall and the bottom wall, and an electromagnetic induction heating coil assembly is arranged at an outer side of the sidewall of the vertical furnace body, and the electromagnetic induction heating coil assembly comprises a plurality of coil units sequentially arranged in a vertical direction; turning on at least part of the plurality of coil units into a heating state to heat the oily solid material to be treated in the heat treatment chamber; determining at least one of the at least part of the plurality of coil units which have been turned on as a coil unit to be regulated, and at least another of the at least part of the plurality of coil units which have been turned on as a reference coil unit, according to a change of filling rate of the oily solid material to be treated in the heat treatment chamber, wherein the reference coil unit is closer to the bottom wall of the vertical furnace body than the coil unit to be regulated in the vertical direction; and reducing a heating power of the coil unit to be regulated while keeping the reference coil unit in the heating state.

In this way, on the one hand, because an electromagnetic induction heating mode is adopted, oil-based drilling waste can be treated while drilling; on the other hand, because heating range and heating power of the plurality of coil units of the electromagnetic induction heating coil assembly are adjusted according to a filling degree of solid material in the heat treatment chamber, deformation caused by uneven heating of the furnace body can be effectively avoided and energy consumption can be reduced.

Figure 2:
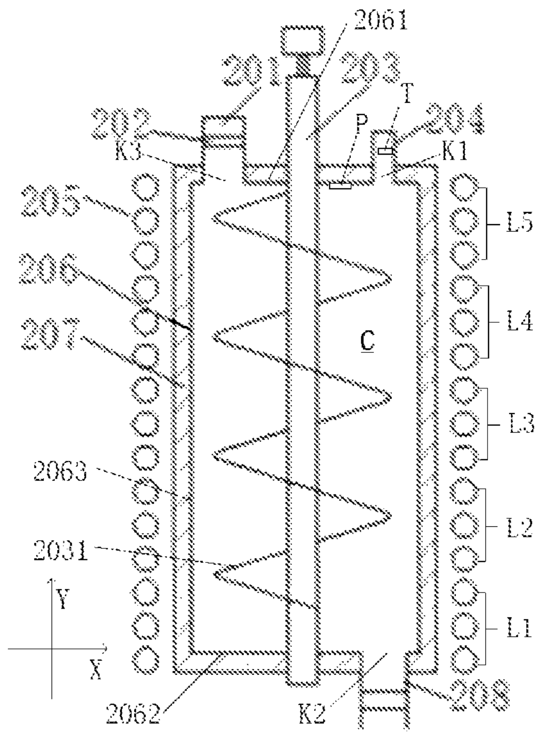
FIG. 2 shows a schematic diagram of a cross-sectional structure of a thermal desorption module in a system for treating oily solid material provided by an embodiment of the present disclosure.

FIG. 1 shows a schematic block diagram of modules and communication relationship thereof in a system for treating oily solid material provided by an embodiment of the present disclosure; FIG. 2 shows a schematic diagram of a cross-sectional structure of a thermal desorption module in a system for treating oily solid material provided by an embodiment of the present disclosure.

Referring to FIG. 1 and FIG. 2, the system for treating oily solid material provided by an embodiment of the present disclosure includes a feeding module M1, a thermal desorption module M2, a thermal desorption vapor treatment module M3, an incondensable gas treatment module M4 and a discharge module M5.

The thermal desorption module M2, the thermal desorption vapor treatment module M3 and the incondensable gas treatment module M4 are sequentially communicated in a gas flowing direction. Herein, for example, the gas flowing direction refers to a flow direction of gas in the thermal desorption module M2, the thermal desorption vapor treatment module M3 and the incondensable gas treatment module M4. The gas can be a gas from the oily solid material to be treated or air.

The feeding module M1, the thermal desorption module M2 and the discharge module M5 are sequentially communicated in a solid material flowing direction. Herein, for example, the solid material flowing direction refers to a moving direction of the oily solid material to be treated in the feeding module M1, the thermal desorption module M2 and the discharge module M5.

The thermal desorption module M2 includes a vertical furnace body 206, a stirring shaft 203 and an electromagnetic induction heating coil assembly 205.

The vertical furnace body 206 includes a top wall 2061 and a bottom wall 2062 which are opposite to each other in a height direction Y, and a sidewall 2063 connecting the top wall 2061 and the bottom wall 2062. Herein, the height direction Y is, for example, a vertical direction. In the height direction Y, for example, the sidewall 2063 does not overlap any one of the top wall 2061 and the bottom wall 2062. In the present embodiment, for example, the top wall 2061 and the bottom wall 2062 are substantially flat walls, and the sidewall 2063 is a cylindrical sidewall. For example, the vertical furnace body 206 is made of carbon steel to meet the requirements of the electromagnetic induction heating coil assembly on furnace body material.

The top wall 2061, the bottom wall 2062 and the sidewall 2063 enclose a heat treatment chamber C extending in the height direction Y. For example, the heat treatment chamber C has a substantially cylindrical shape. It can be understood that the embodiments of the present disclosure do not limit the specific shapes of the top wall 2061, the bottom wall 2062, the sidewall 2063 and the heat treatment chamber C of the vertical furnace body 206.

For example, the stirring shaft 203 is a spiral stirring shaft 203, which is rotatably connected to a vertical furnace body 206, and a part of the spiral stirring shaft 203 is located in the heat treatment chamber C. The part of the spiral stirring shaft 203 located in the heat treatment chamber C has an external thread structure 2031 to drive the oily solid material to be treated in the heat treatment chamber C to move in the heat treatment chamber C. Herein, the specific form of the stirring shaft 203 is not limited.

The electromagnetic induction heating coil assembly 205 includes a plurality of coil units sequentially arranged at an outer side of the sidewall 2063 of the vertical furnace body 206 along the height direction Y. Herein, the outer side of the sidewall 2063 refers to the side of the sidewall 2063 opposite to the heat treatment chamber C. Heating power of each coil unit is configured to be independently controlled. That is, the heating power of any one coil unit can be controlled independently from the other coil units. Herein, the heating power of the coil unit has a value greater than or equal to zero. The magnitude of the heating power of the coil unit corresponds to a heating temperature provided by the coil unit to the vertical furnace body. Upon the heating power of the coil unit being zero, it refers to that the coil unit is in a power-off state; upon the heating power of the coil unit being greater than zero, it refers to that the coil unit is in a heating state for heating the vertical furnace body 206.

In this way, a heating range can be adjusted according to the filling rate of solid material in the heat treatment chamber C by adopting a vertical electromagnetic sectional adjustable heating mode, thus realizing sectional accurate temperature control and indirectly heating the vertical furnace body, thereby avoiding the unfavorable deformation of the vertical furnace body due to uneven heating and reducing the energy consumption of the electromagnetic induction heating coil assembly besides preventing deformation.

Referring to FIG. 2, the electromagnetic induction heating coil assembly 205 includes five coil units L1 to L5. Each of the coil units L1 to L5 includes three coils. For example, the heights of the coil units L1 to L5 in the height direction Y are the same. Embodiments of the present disclosure do not limit the number of coil units included in the electromagnetic induction heating coil assembly 205, the number of coils included in each coil unit, and the height of each coil unit in the height direction.

For example, the plurality of coil units in the electromagnetic induction heating coil assembly 205 are arranged at equal intervals in the height direction Y. In this way, the heating range of the electromagnetic induction heating coil assembly 205 can be controlled more uniformly.

For example, the thermal desorption module M2 further includes a heat insulation layer 207 covering outer surfaces of the top wall 2061, the bottom wall 2062 and the sidewall 2063 of the vertical furnace body 206. Outer surfaces of the top wall 2061, the bottom wall 2062 and the sidewall 2063 are surfaces of the top wall 2061, the bottom wall 2062 and the sidewall 2063 opposite to the heat treatment chamber C. A part of the heat insulation layer 207 is located between the vertical furnace body 206 and the electromagnetic induction heating coil assembly 205. For example, the heat insulation layer 207 adopts ceramic fiber cotton as main body and is covered with glass fiber cloth. In this way, the heat loss of the equipment during operation can be reduced, the electromagnetic induction heating coil can be prevented from being damaged by direct contact with the furnace body, and the temperature uniformity in the heat treatment chamber C can be effectively improved.

Figure 3:
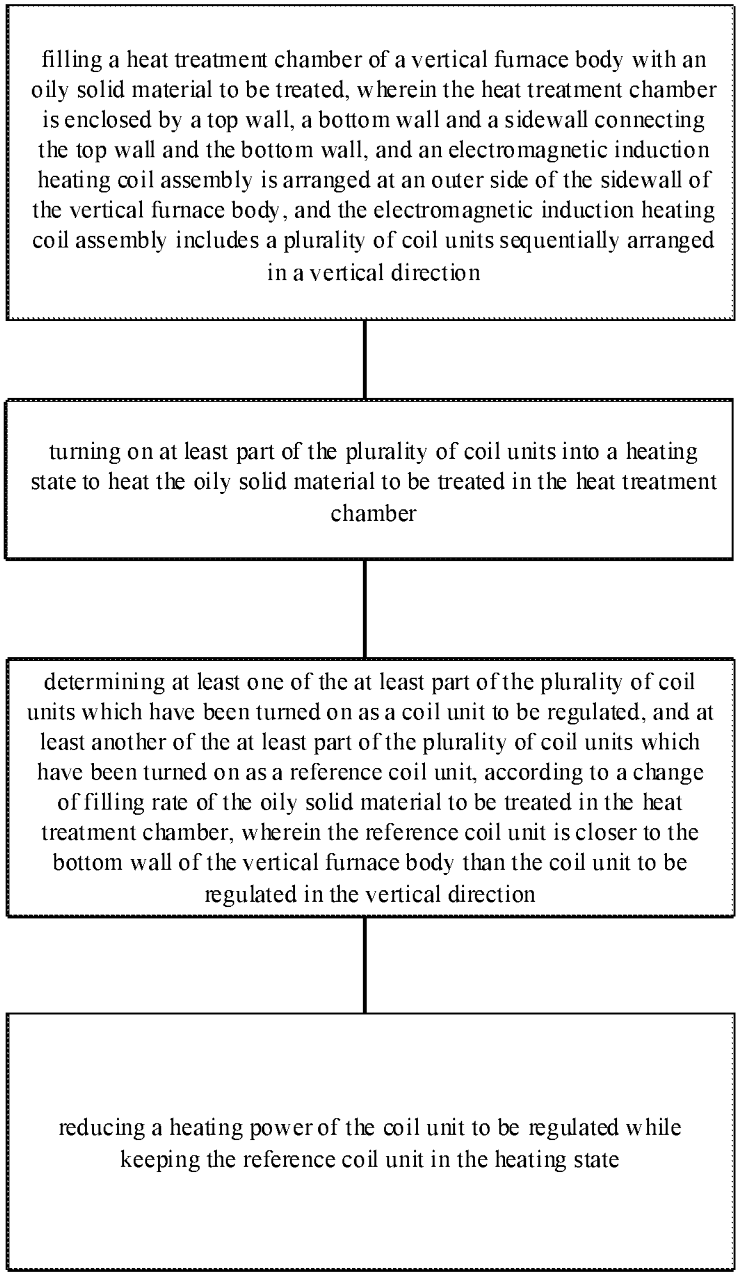
FIG. 3 shows a flow chart of a method for treating oily solid material provided by an embodiment of the present disclosure.
Figures 4A, 4B, 4C:
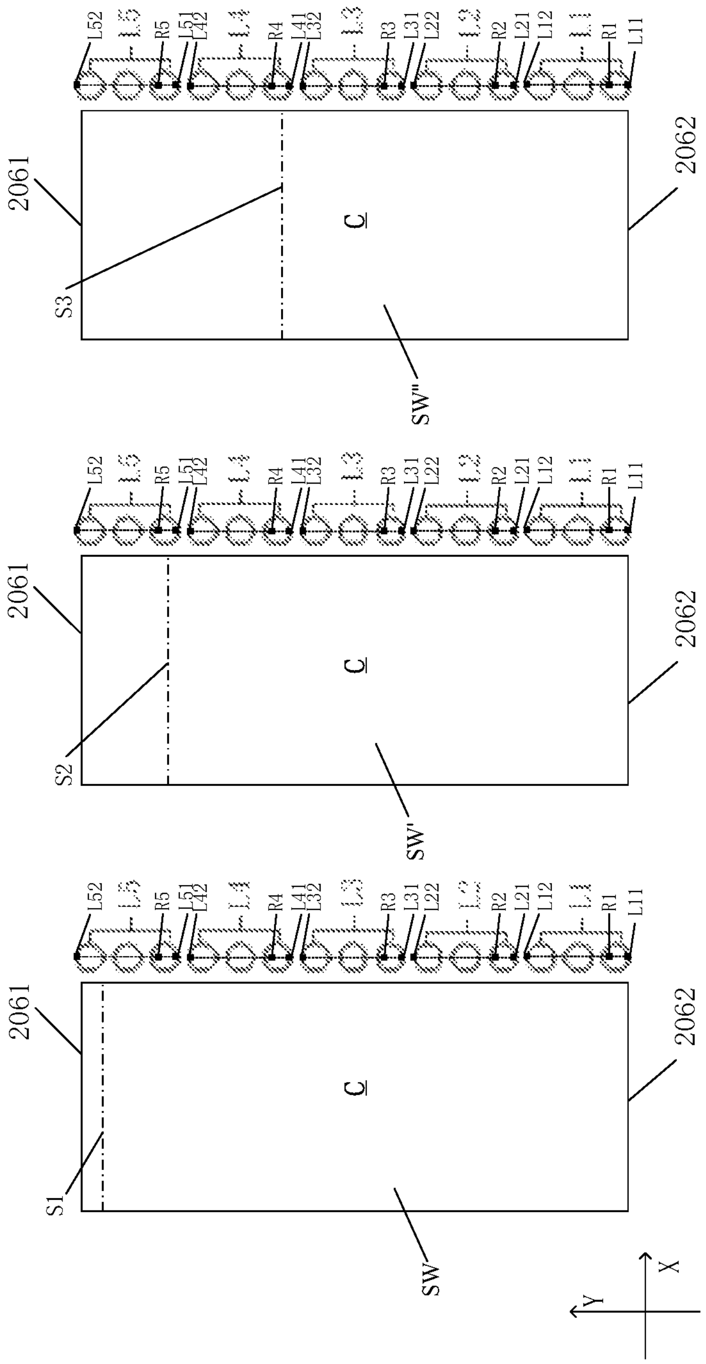
FIGS. 4A to 4C show schematic diagrams of adjusting a heating power of coil units of an electromagnetic induction heating coil assembly according to a filling degree of the oily solid material in the vertical furnace body in the method for treating oily solid material provided by an embodiment of the present disclosure.

FIG. 3 shows a flow chart of a method for treating oily solid material provided by an embodiment of the present disclosure; FIGS. 4A to 4C show schematic diagrams of adjusting a heating power of a coil unit of an electromagnetic induction heating coil assembly according to a filling degree of the oily solid material in the vertical furnace body in the method for treating oily solid material provided by an embodiment of the present disclosure.

For example, the thermal desorption module shown in each of FIGS. 4A to 4C can be the thermal desorption module M2 shown in FIG. 2. In FIGS. 4A to 4C, only a rectangular vertical furnace body 206 and a plurality of coil units L1 to 15 are schematically used to represent the thermal desorption module M2; openings on the top wall 2061 and the bottom wall 2062 of the vertical furnace body 206, a spiral stirring shaft 203, the heat insulation layer 207 and other components are omitted.

The method for treating oily solid material provided by any embodiment of the present disclosure can be implemented by using the system for treating oily solid material provided by any embodiment of the present disclosure.

Referring to FIG. 3 to FIG. 4C, another embodiment of the present disclosure provides a method for treating oily solid material, including:

- filling a heat treatment chamber C of a vertical furnace body 206 with an oily solid material SW to be treated, the heat treatment chamber C is enclosed by a top wall 2061, a bottom wall 2062 and a sidewall 2063 connecting the top wall 2061 and the bottom wall 2062, an electromagnetic induction heating coil assembly 205 is arranged at an outer side of the sidewall 2063 of the vertical furnace body 206, and includes a plurality of coil units L1-L5 sequentially arranged in the vertical direction Y; Herein, for example, the oily solid material SW is oil-based drilling waste;
- turning on at least part of the plurality of coil units L1-l5 into a heating state to heat the oily solid material SW to be treated in the heat treatment chamber C;
- determining at least one of the at least part of the plurality of coil units L1-L5 which have been turned on as a coil unit to be regulated, and at least another of the at least part of the plurality of coil units L1-L5 which have been turned on as a reference coil unit according to a change of a filling rate of the oily solid material to be treated in the heat treatment chamber C, wherein, in the vertical direction Y, the reference coil unit is closer to the bottom wall 2062 of the vertical furnace body 206 than the coil unit to be regulated; and
- reducing a heating power of the coil unit to be regulated while keeping the reference coil unit in the heating state.

Herein, the change of the filling rate of the oily solid material to be treated in the heat treatment chamber C corresponds to a height position of a surface of the oily solid material to be treated facing the top wall 2061 in the vertical direction Y.

The vertical direction Y refers to the gravity direction, for example, the vertical direction Y is substantially perpendicular to the horizontal direction. For example, the sequential arrangement of the plurality of coil units L1 to L5 in the vertical direction Y refers to that the height positions of the plurality of coil units L1 to L5 in the vertical direction Y gradually increase or decrease, but the relative positional relationship of the plurality of coil units L1 to L5 in the horizontal direction is not limited.

It can be understood that, upon the filling rate of the oily solid material to be treated in the heat treatment chamber C being relatively large, the height position of the surface of the oily solid material to be treated facing the top wall 2061 in the vertical direction Y is relatively high (i.e., relatively close to the top wall 2061); upon the filling rate of the oily solid material to be treated in the heat treatment chamber C being relatively small, the height position of the surface of the oily solid material to be treated facing the top wall 2061 in the vertical direction Y is relatively low (i.e., relatively far from the top wall 2061).

Herein, reducing the heating power of the coil unit to be regulated refers to reducing the heating temperature provided by the coil unit to be regulated to the vertical furnace body 206.

Reducing the heating power of the coil unit to be regulated includes reducing the heating power of the coil unit to zero. Reducing the heating power of the coil unit to be regulated to zero refers to that the coil unit to be regulated changes from a heating state upon the power being on to a non-heating state upon the power being off.

Reducing the heating power of the coil unit to be regulated further includes reducing the heating power of the coil unit to be regulated from a larger value to a smaller value greater than zero. Reducing the heating power of the coil unit to be regulated from a larger value to a smaller value greater than zero refers to that the coil unit to be regulated changes from a heating state providing a higher heating temperature to a heating state providing a lower heating temperature.

In this way, in a case where an upper space filled with no solid material due to the gradual reduction of the filling rate of solid material appears in the heat treatment chamber, the heating to the upper space can be reduced, thus ensuring uniform temperature in respective parts of the heat treatment chamber, thereby avoiding adverse deformation of the vertical furnace body, and saving energy consumption of the coil unit besides avoiding deformation.

Compared with the situation that the coil unit to be regulated is powered off, adjusting the coil unit to be regulated to a heating state of a lower temperature can better maintain the temperature uniformity in respective parts of the heat treatment chamber.

For example, reducing the heating power of the coil unit to be regulated while keeping the reference coil unit in a heating state includes reducing the heating power of the coil unit to be regulated by 60% to 90% while keeping the reference coil unit in the heating state. For example, the heating power of the coil unit to be regulated is reduced from 100 KW to 20 KW.

Referring to FIGS. 4A to 4C, in the vertical direction, each coil unit provides a reference position between a position of the coil unit closest to the top wall and a position of the coil unit closest to the bottom wall. Specifically, the coil unit L1 provides a reference position R1 between a position L12 closest to the top wall and a position L11 closest to the bottom wall in the vertical direction Y; the coil unit L2 provides a reference position R2 between a position L22 closest to the top wall and a position L21 closest to the bottom wall in the vertical direction Y; the coil unit L3 provides a reference position R3 between a position L32 closest to the top wall and a position L31 closest to the bottom wall in the vertical direction Y; the coil unit L4 provides a reference position R4 between a position L42 closest to the top wall and a position L41 closest to the bottom wall in the vertical direction Y; the coil unit L5 provides a reference position R5 between a position L52 closest to the top wall and a position L51 closest to the bottom wall in the vertical direction Y. Each coil unit overlaps the reference position provided by itself in a horizontal direction X perpendicular to the vertical direction Y.

It can be understood that, although the above-mentioned reference positions are indicated by points in FIGS. 4A to 4C, any one of the reference positions does not specifically refers to a certain physical structure, but is only used for comparison with a position of the surface of the oily solid material to be treated facing the top wall in the vertical direction Y.

Determining at least one of the at least part of the plurality of coil units L1 to L5 which have been turned on as the coil unit to be regulated according to the change of the filling rate of the oily solid material to be treated in the heat treatment chamber C includes: upon the surface of the oily solid material to be treated facing the top wall is not higher than at least one reference position in the vertical direction, determining the coil unit providing the at least one reference position as the coil unit to be regulated.

Hereinafter, referring to FIGS. 4A to 4C, a process of adjusting the heating power of the coil units of the electromagnetic induction heating coil assembly according to the filling degree of solid material in the vertical furnace in an example will be described in detail.

Referring to FIG. 4A, the oily solid material SW to be treated is filled into the thermal reaction chamber C of the vertical furnace body 206. A surface S1 of the oily solid material SW to be treated facing the top wall 2061 is higher than a reference position R5 provided by the coil unit L5. In this case, for example, all coil units L1 to L5 are turned on to heat the oily solid material SW to be treated with the same heating power.

Referring to FIG. 4B, upon the height of the oily solid material SW to be treated in the thermal reaction chamber C of the vertical furnace body 206 being reduced so that a surface S2 of the remaining oily solid material SW' facing the top wall 2061 is not higher than the reference position R5 provided by the coil unit L5, the coil unit L5 providing the reference position R5 is determined as the coil unit to be regulated, and the coil unit L1 is determined as the reference coil unit. The heating power of the coil unit L5 to be regulated is reduced. In this case, the coil units L1-L4 still maintain the original heating power to heat the remaining oily solid material SW' to be treated.

Referring to FIG. 4C, upon the height of the remaining oily solid material SW' in the thermal reaction chamber C of the vertical furnace body 206 being further reduced so that a surface S3 of the remaining oily solid material SW" facing the top wall 2061 is not higher than the reference position R4 provided by the coil unit L4, the coil unit L4 providing the reference position R4 can be determined as the coil unit to be regulated, and the heating power of the coil unit L4 to be regulated can be reduced. In this case, the coil units L1-L3 still maintain the original heating power to heat the remaining oily solid material SW". Similarly, the heating power of the coil units L3, L2 and L1 can be sequentially reduced.

In another example, upon the surface S2 of the remaining oily solid material SW' facing the top wall 2061 being not higher than the reference position R5 provided by the coil unit L5 but higher than the reference position R4 provided by the coil unit L4, the coil unit L5 can still maintain the original heating power. Upon the surface S3 of the remaining oily solid material SW" facing the top wall 2061 is not higher than the reference position R4 provided by the coil unit L4, both the coil unit L5 providing the reference position R5 and the coil unit L4 providing the reference position R4 can be determined as coil units to be regulated, and the heating power of the coil units L4 and L5 to be regulated can be reduced at the same time. The embodiments of the present disclosure do not limit the order of reducing the heating power of the coil units L5 to L1.

In the vertical direction, with regard to at least one coil unit, a first distance between the reference position provided by the coil unit and the position of the coil unit closest to the bottom wall is greater than or equal to 5 cm and smaller than or equal to 10 cm. In this way, the temperature uniformity in the heat treatment chamber C can be improved. For example, the distance between the position L11 of the coil unit L1 closest to the bottom wall in the vertical direction Y and the reference position R1 is 7 cm; the distance between the position L21 of the coil unit L2 closest to the bottom wall in the vertical direction Y and the reference position R2 is 7 cm; the distance between the position L31 of the coil unit L3 closest to the bottom wall in the vertical direction Y and the reference position R3 is 7 cm; the distance between the position L41 of the coil unit L4 closest to the bottom wall in the vertical direction Y and the reference position R4 is 7 cm; the distance between the position L51 of the coil unit L5 closest to the bottom wall in the vertical direction Y and the reference position R5 is 7 cm.

For example, referring to FIG. 2, the system for treating oily solid material provided by the embodiment of the present disclosure further includes a position detector P located at a side of the top wall 2061 of the vertical furnace body 206 facing the bottom wall. The detector P is configured to detect the height position of the surface, facing the top wall, of the solid material in the heat treatment chamber C of the vertical furnace body 206 in the height direction. For example, the position detector P is a laser rangefinder. The position detector P and the coil units L1-L5 are all electrically connected to a control unit. The control unit can automatically execute the above processing method according to the relationship between the height position of the surface of the solid material facing the top wall in the height direction and the reference positions R1 to R5 detected by the position detector P.

Figure 5:
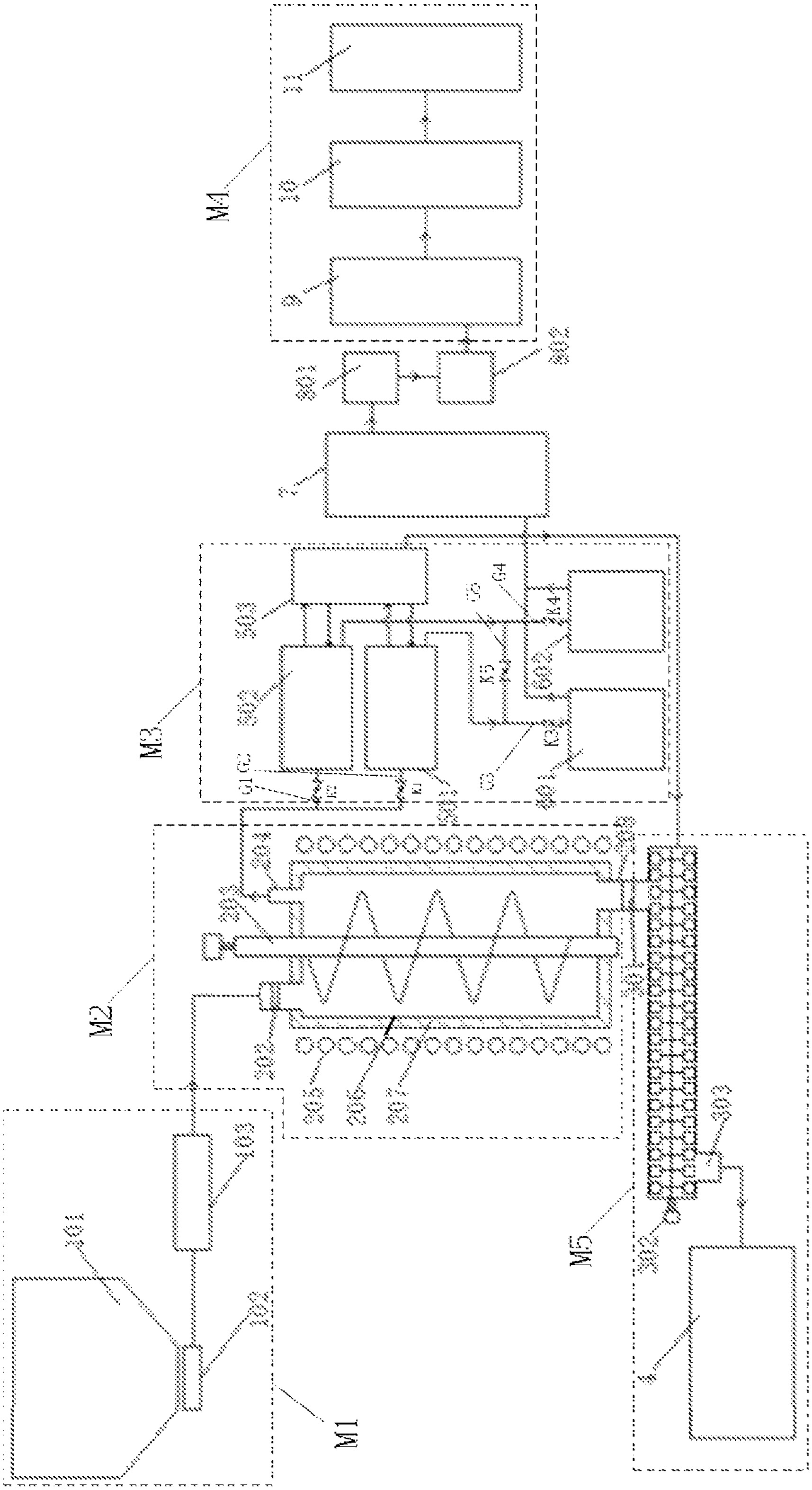
FIG. 5 shows a schematic diagram of components of the respective modules and communication relationship thereof in a system for treating oily solid material provided by an embodiment of the present disclosure.

FIG. 5 shows a schematic diagram of components of the respective modules and communication relationship thereof in a system for treating oily solid material provided by an embodiment of the present disclosure.

Refer to FIG. 5, the thermal desorption vapor treatment module M3 includes a first condense 501 and a first liquid storage tank 601 connected in series and between the vertical furnace body 206 and the incondensable gas treatment module M4, a second condenser 502 and a second liquid storage tank 602 connected in series and between the vertical furnace body 206 and the incondensable gas treatment module M4, and a first valve assembly. The vertical furnace body 206 is connected with a first condenser 501 and a second condenser 502 through the first valve assembly. The first valve assembly is configured to switch between a first communication state and a second communication state. The first communication state is a state that the heat treatment chamber C of the vertical furnace body 206 is communicated with the first condenser 501 but not communicated with the second condenser 502; the second communication state is a state that the heat treatment chamber C of the vertical furnace body 206 is communicated with the second condenser 502 but not communicated with the first condenser.

For example, each of the first condenser 501 and the second condenser 502 is a pipe bundle condenser.

Specifically, the first valve assembly includes, for example, a first valve K1 and a second valve K2.

The first valve K1 is disposed on a first pipeline G1 connecting the heat treatment chamber C of the vertical furnace body 206 with the first condenser 501 to control a conduction state of the first pipeline G1.

The second valve K2 is provided on a second pipeline G2 connecting the heat treatment chamber C of the vertical furnace body 206 with the second condenser 502 to control a conduction state of the second pipeline G2.

For example, each of the first valve K1 and the second valve K2 is a temperature control valve.

The first valve K1 is configured to be in an open state upon a monitored temperature being smaller than or equal to a first temperature, so that the heat treatment chamber C is communicated with the first condenser 501 through the first pipeline G1; and the first valve K1 is in a closed state upon the monitored temperature being greater than the first temperature, so that the heat treatment chamber C is not communicated with the first condenser 501.

The second valve K2 is configured to be in a closed state upon the monitored temperature being smaller than or equal to the first temperature, so that the heat treatment chamber C is not communicated with the second condenser 502; and the second valve K2 is in an open state upon the monitored temperature is greater than the first temperature, so that the heat treatment chamber C is communicated with the second condenser 502 through the second pipeline G2.

For example, each of the first valve K1 and the second valve K2 is configured to be manually switchable. That is, the open state and the closed state of each of the first valve K1 and the second valve K2 can be manually controlled.

Herein, the monitored temperature is a temperature of the heat treatment chamber C or a temperature of a cavity between the heat treatment chamber C and the first condenser 501 and the second condenser 502 along the gas flowing direction. The temperature of the cavity can refer to a temperature at any position in the cavity.

In this way, according to that the time stages of generated water vapor and generated oil vapor in the thermal desorption process are different, the two distillate gases can be directed into two sets of condensers respectively, so as to realize the independent recovery of oil and water. Two sets of condensers can also be used as backup for each other to ensure the long-term stable operation of the treatment system.

It can be understood that the embodiment of the present disclosure does not limit the specific structure of the first valve assembly. For example, in another example, the first valve component can be a three-way diverter valve, a fluid inlet of which is communicated with the heat treatment chamber C of the vertical furnace body 206, and two fluid outlets of which are communicated with the first condenser 501 and the second condenser 502, respectively. The three-way diverter valve can be, for example, a temperature control valve, which is configured to allow the heat treatment chamber C to be communicated with the first condenser 501 but not communicated with the second condenser 502 upon the monitored temperature being smaller than or equal to the first temperature, and to allow the heat treatment chamber C to be communicated with the second condenser 502 but not communicated with the first condenser 501 upon the monitored temperature being greater than the first temperature.

For example, the system for treating oily solid material provided by the embodiment of the present disclosure further includes a tubular member 204 and a temperature sensor T. The tubular member 204 is communicated with the heat treatment chamber C at a first opening K1 of the top wall 2061 of the vertical furnace body. A temperature sensor T is located in a tubular cavity of the tubular member 204. In the height direction, the temperature sensor T is located at a side of the top wall 2061 opposite to the bottom wall. The temperature sensor T is configured to provide the above-mentioned monitored temperature. For example, the temperature sensor T is a thermocouple.

For example, the vertical furnace body 206 is internally provided with a plurality of further sensing probes, which can monitor parameters such as air pressure in the heat treatment chamber C in real time.

For example, the first valve K1, the second valve K2, and the temperature sensor T are all electrically connected to the control unit, so that the control unit can control the open state and closed state of the first valve K1 and the second valve K2 according to the temperature signal obtained by the temperature sensor T. In addition, in the case where any one of the first condenser 501 and the second condenser 502 fails, the control unit can realize the selection of different condensation paths by controlling the open state and closed state of the first valve K1 and the second valve K2.

For example, the first condenser 501 and the second condenser 502 are connected with the first liquid storage tank 601 and the second liquid storage tank 602 through a second valve assembly.

The second valve assembly is configured to be switchable among at least a third communication state, a fourth communication state, and a fifth communication state.

The third communication state is a state that the first condenser 501 is communicated with the first liquid storage tank 601 but not communicated with the second liquid storage tank 602, and the second condenser 502 is communicated with the second liquid storage tank 602 but not communicated with the first liquid storage tank 601.

The fourth communication state is a state that the first condenser 501 is communicated with the second liquid storage tank 602 but not communicated with the first liquid storage tank 601.

The fifth communication state is a state that the second condenser 502 is communicated with the first liquid storage tank 601 but not communicated with the second liquid storage tank 602.

For example, referring to FIG. 5, the second valve assembly includes a third valve, a fourth valve and a fifth valve.

A third valve K3 is arranged on a third pipeline G3 connecting the first condenser 501 and the first liquid storage tank 601 to control a conduction state of the third pipeline G3;

The fourth valve K4 is arranged on the fourth pipeline G4 connecting the second condenser 502 and the second liquid storage tank 602 to control a conduction state of the fourth pipeline G4.

The fifth valve K5 is provided on the fifth pipeline G5 connecting the third pipeline G3 and the fourth pipeline G4 to control a conduction state of the fifth pipeline G5.

In this way, in the case where any one of the first condenser 501, the second condenser 502, the first liquid storage tank 601 and the second liquid storage tank 602 is unavailable, the condensation path in the thermal desorption vapor treatment module M3 can be selected and controlled through the first valve assembly and the second valve assembly.

In another example, the first condenser 501 is directly communicated with the first liquid storage tank 601 through a third pipeline G3, and the second condenser 502 is directly communicated with the second liquid storage tank 602 through a fourth pipeline G4. A valve is not arranged on the third pipeline G3 and the fourth pipeline G4, and the third pipeline G3 and the third pipeline G4 are not communicated.

For example, in the method for treating oily solid material provided by the embodiment of the present disclosure, turning on at least part of the plurality of coil units L1 to L5 into a heating state to heat the oily solid material to be treated in the heat treatment chamber C includes:

Raising a temperature in the heat treatment chamber C to a first temperature and keeping the temperature in the heat treatment chamber C at the first temperature for a first time period;

Condensing and collecting a first distillate evaporated from the oily solid material to be treated through a first condensing pipeline communicated with the heat treatment chamber C in the first time period;

Raising the temperature in the heat treatment chamber C to a second temperature and keeping the temperature in the heat treatment chamber C at the second temperature for a second time period, the second temperature being greater than the first temperature; and Condensing and collecting a second distillate evaporated from the oily solid material to be treated through a second condensing pipeline communicated with the heat treatment chamber C in the second time period.

Herein, the first condensation pipeline can be a pipeline formed by the first pipeline G1 with the first valve K1, the first condenser 501, the third pipeline G3 and the first liquid storage tank 601 shown in FIG. 5. The second pipeline may be a pipeline formed by the first pipeline G2 with the second valve K2, the second condenser 502, the fourth pipeline G4 and the second liquid storage tank 602 shown in FIG. 5.

A gas pressure in the heat treatment chamber is a first pressure in the first time period, and the first temperature is greater than or equal to a first boiling point temperature of water under the first pressure and less than a second boiling point temperature of an oil-based substance in the oily solid materials under the first pressure.

A gas pressure in the heat treatment chamber is a second pressure in the second time period, and the second temperature is greater than or equal to a third boiling point temperature of an oil-based substances in the oily solid materials under the second pressure.

For example, both the first pressure and the second pressure are substantially equal to 20 KPa. In another example, the first pressure and the second pressure may not be substantially equal.

For example, the first temperature is about 70° C. and the second temperature is about 300° C.

In this way, water and oil can be recovered in different time periods by adjusting different heating temperature ranges in a way of intermittent feeding. The purity of recovered oil can be ensured, and the separation process of oil-water mixture is saved.

The thermal desorption vapor treatment module M3 further includes a cooling device 503 connected with the first condenser 501 and the second condenser 502. The cooling device 503 is, for example, a closed cooling tower. The heat exchange of cooling fluid medium in the cooling tower is mainly through air cooling and water cooling.

The method for treating oily solid material provided by the embodiment of the present disclosure realizes the independent recovery of water and oil in the process of thermal desorption. Due to the different generation stages of water vapor and oil vapor, the two distillate gases will be directed into a pipe bundle condenser 501 and a pipe bundle condenser 502 for condensation, and the condensed water and recovered oil will enter a buffer tank 601 and a buffer tank 602 respectively. The closed cooling tower 503 provides cooling fluid medium (such as water) for the pipe bundle condensers 501 and 502. In addition, two sets of pipe bundle condensers can be used as backup for each other, ensuring the long-term stable operation of the equipment.

The system for treating oily solid material provided by the embodiment of the present disclosure further includes, for example, a chevron mist eliminator 7, a water ring vacuum pump 801 and a Roots vacuum pump 802 which are sequentially communicated in series and between the thermal desorption vapor treatment module M3 and the incondensable gas treatment module M4 in the gas flowing direction.

In this way, the working condition of vacuum negative pressure can be generated inside the vertical furnace body 206. The water ring vacuum pump 801 and the Roots pump 802 capture the distillate gas generated in the operation of the vertical furnace body 206, and keep the internal vacuum negative pressure (vacuum pressure ≤−900 mbar), which can reduce the temperature required by the oil-based drilling waste in the thermal desorption process, reduce the gas generated by cracking due to high temperature, and meanwhile effectively reduce energy consumption and improve the quality of recovered oil.

In the system for treating oily solid material provided by the embodiment of the present disclosure, the incondensable gas treatment module M4 includes, for example, an alkali washing device 9, a deep cooling device 10 and an activated carbon adsorption device 11 which are sequentially connected in series in the gas flowing direction.

Incondensable gas passes through chevron mist eliminator 7 to remove mist droplets and then enters the alkali washing tower 9. After acid gas is removed, the remaining incondensable gas is treated by deep cooling device 10, the temperature can be reduced to 5-10° C., and then discharged after being treated by activated carbon adsorption device 11.

The discharge module M5 of the system for treating oily solid material provided by the embodiment of the present disclosure includes a discharge screw conveyor 302. The discharge screw conveyor 302 is communicated with the heat treatment chamber C at a second opening K2 of the bottom wall 2062 of the vertical furnace body 206 through a tubular member 208 with a discharge valve 301. A cooling device 503 is connected with the discharge screw conveyor 302 to provide a cooling fluid medium for the discharge screw conveyor 302. The discharge module M5 further includes a storage bin 4. The storage bin 4 is connected to the discharge screw conveyor 302 through a tubular member 303. The treated solid material in the vertical furnace body 206 enter the discharge screw conveyor 302 through the tubular member 208, are sprayed and cooled by the cooling fluid medium from the cooling device 503, and are discharged into the storage bin 4.

The feeding module M1 of the oily solid material treatment system provided by the embodiment of the present disclosure includes a hopper 101, a feeding screw conveyor 102 and a transfer pump 103 which are connected in sequence, and the transfer pump 103 is communicated with the heat treatment chamber C at a third opening K3 of the top wall 2061 of the vertical furnace body 206 through a tubular member 201 with a feeding valve 202. The feeding screw conveyor 102 is, for example, a double screw conveyor. Oil-based drilling waste falls into the vertical furnace body 206 through the tubular member 201 with a feed valve 202 by a delivery pump 103, and is stirred and homogenized by the spiral stirring shaft 203.

The system for treating oily solid material provided by the embodiment of the disclosure is matched with the method for treating oily solid material, which can not only solve the problems of open flame restriction and uneven heating of vertical furnace body, but also ensure the reduction of equipment energy consumption, the independent recovery of water and oil, and the improvement of the quality of recovered oil, and meanwhile ensure the treatment index and requirements of pollutants in the whole process.

Herein, some points needs to be explained:

(1) Drawings of the embodiments of the present disclosure only refer to structures related with the embodiments of the present disclosure, and other structures may refer to general design.

(2) For clarity, in the drawings used to describe embodiments of the present disclosure, the thickness of layers or regions is enlarged or reduced, i.e., these drawings are not drawn to actual scale.

(3) In case of no conflict, features in the same embodiment and different embodiments of the present disclosure may be combined with each other to obtain new embodiments.

The foregoing embodiments merely are exemplary embodiments of the present disclosure, and not intended to limit the scope of the present disclosure, and the scope of the present disclosure is determined by the appended claims.

The invention claimed is:

1. A system for treating oily solid material, comprising a thermal desorption module, a thermal desorption vapor treatment module and an incondensable gas treatment module which are sequentially communicated in a gas flowing direction, wherein, the thermal desorption module comprises:

a vertical furnace body, comprising a top wall and a bottom wall which are opposite to each other in a height direction, and a sidewall connecting the top wall and the bottom wall, wherein the top wall, the bottom wall, and the sidewall enclose a heat treatment chamber extending in the height direction;

a stirring shaft, connected with the vertical furnace body, a part of the stirring shaft being located in the heat treatment chamber; and an electromagnetic induction heating coil assembly, comprising a plurality of coil units, wherein the plurality of coil units are sequentially arranged at an outer side of the sidewall of the vertical furnace body along the height direction, and a heating power of each of the plurality of coil units is configured to be independently controlled.

2. The system for treating oily solid material according to claim 1, wherein the thermal desorption vapor treatment module comprises:

a first condenser and a first liquid storage tank, connected in series and between the vertical furnace body and the incondensable gas treatment module;

a second condenser and a second liquid storage tank, connected in series and between the vertical furnace body and the incondensable gas treatment module; and a first valve assembly, wherein the vertical furnace body is connected with the first condenser and the second condenser through the first valve assembly, and the first valve assembly is configured to switch between a first communication state and a second communication state, the first communication state is a state that the heat treatment chamber of the vertical furnace body is communicated with the first condenser but not communicated with the second condenser; the second communication state is a state that the heat treatment chamber of the vertical furnace body is communicated with the second condenser but not communicated with the first condenser.

3. The system for treating oily solid material according to claim 2, wherein, the first valve assembly comprises:

a first valve, arranged on a first pipeline connecting the heat treatment chamber of the vertical furnace body with the first condenser to control a conduction state of the first pipeline; and a second valve, arranged on a second pipeline connecting the heat treatment chamber of the vertical furnace body with the second condenser to control a conduction state of the second pipeline.

4. The system for treating oily solid material according to claim 3, wherein each of the first valve and the second valve is a temperature control valve, the first valve is configured to be in an open state upon a monitored temperature being smaller than or equal to a first temperature, so that the heat treatment chamber is communicated with the first condenser through the first pipeline, and in a closed state upon the monitored temperature is greater than the first temperature, so that the heat treatment chamber is not communicated with the first condenser, the second valve is configured to be in a closed state upon the monitored temperature being smaller than or equal to the first temperature, so that the heat treatment chamber is not communicated with the second condenser, and in an open state upon the monitored temperature is greater than the first temperature, so that the heat treatment chamber is communicated with the second condenser through the second pipeline, wherein the monitored temperature is a temperature of the heat treatment chamber or a temperature of a cavity between the heat treatment chamber and the first condenser and the second condenser along the gas flowing direction.

5. The system for treating oily solid material according to claim 4, further comprising:

a tubular member, communicated with the heat treatment chamber at a first opening of the top wall of the vertical furnace body, and a temperature sensor, located in a tubular cavity of the tubular member, wherein, in the height direction, the temperature sensor is located at a side of the top wall opposite to the bottom wall, the temperature sensor is configured to provide the monitored temperature.

6. The system for treating oily solid material according to claim 2, wherein the first condenser and the second condenser are connected with the first liquid storage tank and the second liquid storage tank through a second valve assembly, the second valve assembly is configured to switch between a third communication state, a fourth communication state, and a fifth communication state, wherein, the third communication state is a state that the first condenser is communicated with the first liquid storage tank but not communicated with the second liquid storage tank, and the second condenser is communicated with the second liquid storage tank but not communicated with the first liquid storage tank;

the fourth communication state is a state that the first condenser is communicated with the second liquid storage tank but not communicated with the first liquid storage tank;

the fifth communication state is a state that the second condenser is communicated with the first liquid storage tank but not communicated with the second liquid storage tank.

7. The system for treating oily solid material according to claim 6, wherein the second valve assembly comprises:

a third valve arranged on a third pipeline connecting the first condenser and the first liquid storage tank to control a conduction state of the third pipeline;

a fourth valve arranged on a fourth pipeline connecting the second condenser and the second liquid storage tank to control a conduction state of the fourth pipeline; and a fifth valve arranged on a fifth pipeline connecting with the third pipeline and the fourth pipeline to control a conduction state of the fifth pipeline.

8. The system for treating oily solid material according to claim 1, further comprising a chevron mist eliminator, a water ring vacuum pump and a Roots vacuum pump which are sequentially connected in series and between the thermal desorption vapor treatment module and the incondensable gas treatment module in the gas flowing direction.

9. The system for treating oily solid material according to claim 1, wherein the incondensable gas treatment module comprises an alkali washing device, a deep cooling device and an activated carbon adsorption device which are sequentially connected in series in the gas flowing direction.

10. The system for treating oily solid material according to claim 2, further comprising a discharge screw conveyor, communicated with the heat treatment chamber at a second opening of the bottom wall of the vertical furnace body through a discharge valve, the thermal desorption vapor treatment module further comprises a cooling device which is connected with the first condenser, the second condenser and the discharge screw conveyor to provide cooling fluid media for the first condenser, the second condenser and the discharge screw conveyor.

11. The system for treating oily solid material according to claim 1, further comprising a feeding module, wherein the feeding module comprises a hopper, a feeding screw conveyor and a transfer pump which are connected in sequence, and the transfer pump is communicated with the heat treatment chamber at a third opening of the top wall of the vertical furnace body through a feeding valve.

12. The system for treating oily solid material according to claim 1, further comprising a position detector located at a side of the top wall facing the bottom wall, configured to detect a height position of a surface of a solid material facing the top wall in the heat treatment chamber of the vertical furnace body in the height direction.

13. The system for treating oily solid material according to claim 1, wherein the thermal desorption module further comprises an heat insulation layer covering outer surfaces of the top wall, the bottom wall and the sidewall of the vertical furnace body, and a part of the heat insulation layer is located between the vertical furnace body and the electromagnetic induction heating coil assembly.

14. A method for treating oily solid material, comprising:

filling a heat treatment chamber of a vertical furnace body with an oily solid material to be treated, wherein the heat treatment chamber is enclosed by a top wall, a bottom wall and a sidewall connecting the top wall and the bottom wall, and an electromagnetic induction heating coil assembly is arranged at an outer side of the sidewall of the vertical furnace body, and the electromagnetic induction heating coil assembly comprises a plurality of coil units sequentially arranged in a vertical direction;

turning on at least part of the plurality of coil units into a heating state to heat the oily solid material to be treated in the heat treatment chamber;

determining at least one of the at least part of the plurality of coil units which have been turned on as a coil unit to be regulated, and at least another of the at least part of the plurality of coil units which have been turned on as a reference coil unit, according to a change of filling rate of the oily solid material to be treated in the heat treatment chamber, wherein the reference coil unit is closer to the bottom wall of the vertical furnace body than the coil unit to be regulated in the vertical direction; and reducing a heating power of the coil unit to be regulated while keeping the reference coil unit in the heating state.

15. The method for treating oily solid material according to claim 14, wherein, in the vertical direction, each of the plurality of coil units provides a reference position between a position closest to the top wall and a position closest to the bottom wall, determining at least one of the at least part of the plurality of coil units which have been turned on as the coil unit to be regulated according to the change of filling rate of the oily solid material to be treated in the heat treatment chamber comprises:

upon the surface of the oily solid material to be treated facing the top wall is not higher than at least one reference position in the vertical direction, determining the coil unit providing the at least one reference position as the coil unit to be regulated.

16. The method for treating oily solid material according to claim 15, wherein, in the vertical direction, for at least one of the coil units, a distance between the reference position provided thereby and the position thereof closest to the bottom wall is greater than or equal to 5 cm and smaller than or equal to 10 cm.

17. The method for treating oily solid material according to claim 14, wherein reducing the heating power of the coil unit to be regulated while keeping the reference coil unit in the heating state comprises: reducing the heating power of the coil unit to be regulated by 60% to 90% while keeping the reference coil unit in a heating state.

18. The method for treating oily solid material according to claim 14, wherein turning on at least part of the plurality of coil units into a heating state to heat the oily solid material to be treated in the heat treatment chamber comprises:

raising a temperature in the heat treatment chamber to a first temperature and keeping the temperature in the heat treatment chamber at the first temperature for a first time period;

condensing and collecting a first distillate evaporated from the oily solid material to be treated through a first condensing pipeline communicated with the heat treatment chamber in the first time period;

raising the temperature in the heat treatment chamber to a second temperature and keeping the temperature in the heat treatment chamber at the second temperature for a second time period, the second temperature being greater than the first temperature; and condensing and collecting a second distillate evaporated from the oily solid material to be treated through a second condensing pipeline communicated with the heat treatment chamber in the second time period.

19. The method for treating oily solid material according to claim 18, wherein a gas pressure in the heat treatment chamber is a first pressure in the first time period, and the first temperature is greater than or equal to a first boiling point temperature of water under the first pressure and less than a second boiling point temperature of an oil-based substance in the oily solid material under the first pressure.

20. The method for treating oily solid material according to claim 18, wherein a gas pressure in the heat treatment chamber is a second pressure in the second time period, and the second temperature is greater than or equal to a third boiling point temperature of an oil-based substances in the oily solid material under the second pressure.

* * * * *